United States Patent [19]

Ogasawara

[11] Patent Number: 5,285,139
[45] Date of Patent: Feb. 8, 1994

[54] METHOD AND DEVICE FOR CONTROLLING MOTOR IN A POWERED SEAT

[75] Inventor: Hiromitsu Ogasawara, Tokyo, Japan
[73] Assignee: Tachi-S-Co. Ltd., Akishima, Japan
[21] Appl. No.: 888,555
[22] Filed: May 22, 1992
[51] Int. Cl.[5] .......................... G05D 3/12; H02P 3/12
[52] U.S. Cl. ................................ 318/466; 318/286;
318/380; 318/62; 318/86; 318/56; 388/907.5
[58] Field of Search ............... 318/264, 265, 266, 286,
318/379, 380, 430, 431, 466, 467, 468, 51, 53,
54, 55, 56, 57, 59, 60, 62, 86; 388/907.5

[56] References Cited

U.S. PATENT DOCUMENTS

| | | | |
|---|---|---|---|
| 3,649,896 | 3/1972 | Mason et al. | 318/387 |
| 4,933,611 | 6/1990 | Albanesius et al. | 318/285 |
| 5,004,967 | 4/1991 | Ogasawara | 318/568.1 |
| 5,019,759 | 5/1991 | Takemura et al. | 318/466 |
| 5,019,765 | 5/1991 | Ogasawara | 318/628 |

Primary Examiner—Bentsu Ro
Attorney, Agent, or Firm—Oldham, Oldham & Wilson Co.

[57] ABSTRACT

Method and device for controlling a motor in a powered seat, wherein one of normal and reverse drive signals from manual or auto switch is detected by a central processing unit, which in turn provides a first period of time defined between one point when the motor starts to drive in normal direction and another point when the normal drive of the motor is stopped, and a second period of time defined between one point when the motor starts to drive in reverse direction and another point when the reverse drive of the motor is stopped, and then, a motor torque switch element brings resistor in electrical connection with the motor terminal, only druing one of those first and second periods of time.

7 Claims, 9 Drawing Sheets

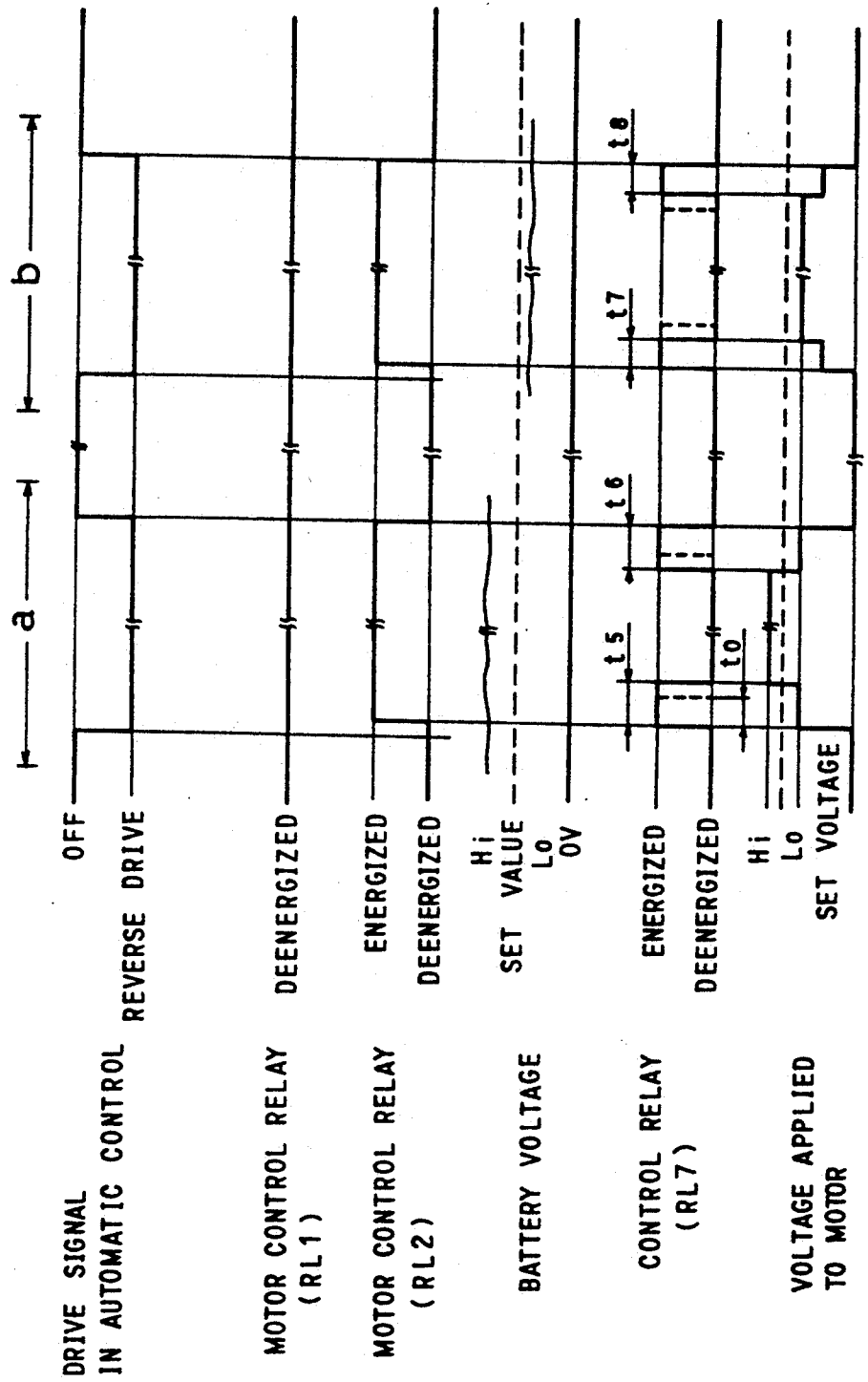

METHOD AND DEVICE FOR CONTROLLING MOTOR IN A POWERED SEAT

BACKGROUND OF INVENTION

1. Field of the Invention

The present invention relates to a method and device for controlling motor in a powered seat for an automobile in order to adjust and actuate the movable parts of seating posture adjustment devices according to the physique and taste of an occupant on the seat.

2. Description of Prior Art

In general, a powered seat for automobile is equipped with various seating posture adjustment devices workable under motor controls, such as a seat slide device, a vertical position adjustment device (a seat lifter), and a reclining device.

The motors used in this particular seat are DC geared motor in most cases, and they are connected with motor control devices, permitting their controls to be made by on/off switching operations with associated motor control relays. As a means for stopping the motors is normally formed by a dynamic braking system utilizing a short circuit formation between both terminals of each motor so as to instantaneously cease the drive of motor and keep the motor in such stopped state. The dynamic braking is indeed effective in improving a precision in stopping the motor or the associated movable parts of seating adjustment devices.

In this powered seat, in particular, with regard to such device having a relatively wide movable range as the seat slide device, it is so designed that the associated motors will be driven more rapidly with an increased rotational speed in order to insure more quick movement of the related movable parts of slide device.

However, in the present system, the motor starts to work or stop, quite abruptly, due to the on/off switching operations which causes an abrupt supply or cut of a voltage to the motor. Thus, such abrupt starting or stop operation is transmitted through the devices to an occupant on the seat as a great shock or impact, so that he or she feels uneasy in adjusting or controlling the slide device or other similar device.

Generally, an incentive in solving this problem arises to use a transistor-based motor speed control device having transistors or field effect transistors (FET).

But, such motor control device tends to be complicated in structure and higher in costs, because of those expensive transistors. Further, the transistors are prone to emitting a heat or switching noises, which will adversely affect the adjacent electronic elements and circuits.

SUMMARY OF THE INVENTION

In view of the above-stated circumstances, it is a purpose of the present invention to provide an improved method and device for controlling motor in a powered seat, which permits for properly suppressing an abrupt drive commencement and stop of motor to thereby avoid a shock or impact to an occupant on the seat.

In order to achieve such purpose, according to the invention, the basic method comprises the steps of: supplying a first ordinary voltage; detecting one of normal and reverse drive signals; giving a certain period of time; bringing a transistor means in an electrical connection, in series, with a terminal of a motor, only during such certain period of time; suppressing, thereby, said first voltage to supply a second lowered voltage to the motor; causing a low-speed drive of the motor under the second voltage in one of normal and reverse directions; after lapse of the certain time, releasing the electrical connection of the transistor means with the motor terminal; then, allowing direct supply of the first ordinary voltage to the motor without presence of the resistor means; and causing again the motor to drive at the first voltage in one of the normal and reverse directions.

In this basic method, the foregoing period of time is properly controlled as follows:

(a) The period of time is defined from a time point when one of the normal and reverse drive signals is emitted, so as to cause the motor to start driving at a low speed under the second voltage in the corresponding direction;

(b) The period of time includes a first one defined until the motor is stopped in one of the normal and reverse directions, and second one defined until the motor is stopped in one of those two directions, so as to cause low-speed drive of the motor during either of those first and second periods of time, after which, a dynamic braking effect is provided to the motor for stopping same at such low speed; and (c) the above control modes may be effected in manual and automatic control modes.

It is another purpose of the invention to provide a device for effecting the above-described method.

To this end, the device basically comprises: a manual switch for effecting the manual control mode; an automatic switch for effecting the automatic mode; a motor torque switch means, by which a predetermined resistor means may be selectively brought in electrical connection with a terminal of the motor so as to change a troque of the motor; and a central processing unit which processes an input data according to a predetermined program, so as to control at least a drive of the motor and actuation of the motor torque switch means, such that the aforementioned periods of time are properly controlled, depending on either of the manual and automatic controls, and on whether the motor starts to drive or is stopped in either of the normal and reverse directions.

In one aspect of the invention, there may be provided a means for checking a voltage supplied from a power source to the motor. Such means may be a device which is capable of comparing such supplied voltage with a given reference value present therein and detecting whether the voltage is lower or higher than the reference value, with such an arrangement that the central processing unit recognizes a result from the detection and controls properly a timing for actuating the motor torque switch means to bring the resistor means in electrical connection with the terminal of motor in series, depending upon such result.

BRIEF DESCRIPTION OF THE DRAWINGS

FIG. 12 is a time chart diagram related to that second embodiment for controlling the motor in an automatic control mode.

DETAILED DESCRIPTION OF PREFERRED EMBODIMENT OF THE INVENTION

Figure 1:
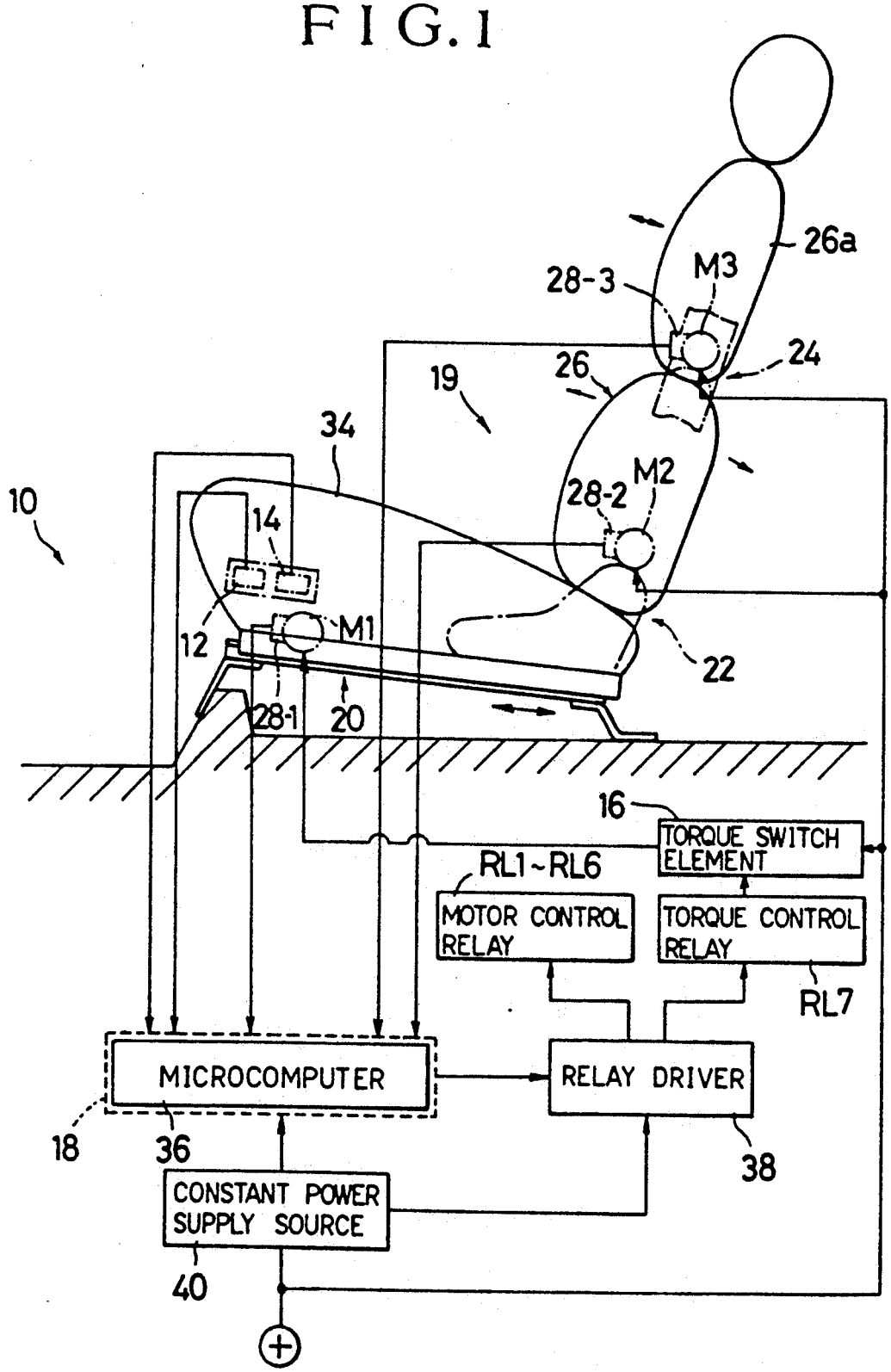
FIG. 1 is a schematic block diagram of a motor control device in a powered seat according to the present invention.
Figure 2:
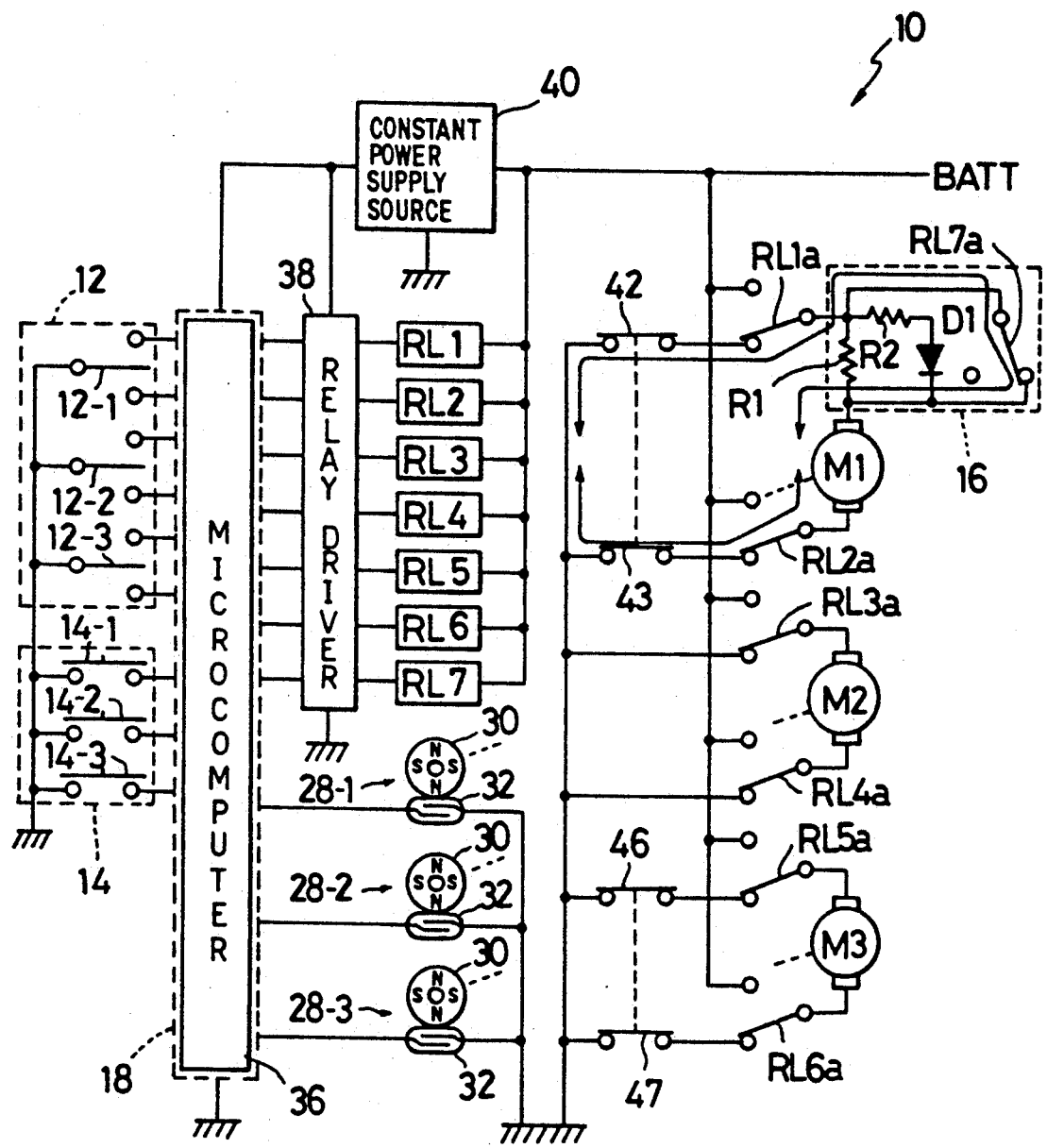
FIG. 2 is a diagram of a circuit related to the motor control device.

Referring to FIGS. 1 and 2, there is shown a motor control device (10) for a powered seat (19), which basically comprises a manual switch (12), an automatic switch (14), a troque switch element (16), a central processing unit (18) to be referred to as "CPU", and motors (M1)(M2)(M3).

The motors (M1)(M2)(M3) are DC geared motors adapted to cause actuation of a seat slide device (20), a reclining device (22) and a seat back bending device (24), respectively. Such so-called seat back bending device (24) is hereby defined to be a device to cause the upper part of seat back to bend or move forwardly and backwardly relative to the lower base part of seat back. As best shown in FIG. 2, the motors (M1 to M3) are electrically connected with a power source or battery (not shown) via the relay contacts (RL1a to RL6a) respectively of motor relays (RL1 to RL6), such that the switching operations of those relay contacts assists in conrolling the drive of motors.

The seat slide device (20) is actuated by control of the motor (M1) to permit adjustment in position of the seat (19) in the fore-and-aft direction. The reclining device (22) is actuated by control of the second motor (M2) to permit adjustment of reclining angle of a seat back (26). The seat back bending device (24) is actuated by control of the third motor (M3) to permit adjustment of tilt angle of an upper part (26a) of the seat back (26). Those devices are known, and not the subject matter of the present invention. Thus, no specific explanation will be made thereon.

As shown in FIGS. 1 and 2, the motors (M1)(M2)(M3) are provided with the position detectors (28-1)(28-2)(28-3), respectively. Each of the detectors comprises a rotation sensor having a disc-like permanent magnet 30) and a reed switch (32) disposed adjacent thereto. The magnet (30) is fixed to an output shaft (not shown) of the motor. With rotation of the magnet (30), the reed switch (32) generates pulses. The reed switch (32) is connected with the CPU (18), so that the pulses generated from the switch (32) are input into the CPU (18) for counting and storing the number of pulses in memory, as the number of rotation of motor. In this way, the fore-and-aft position of seat (29), the reclining angle of seat back (26) and the tilt angle of seat back upper part (26) are detected. It is noted that the pulse number will be counted up when the motors (M1) (M2)(M3) are driven in the normal direction, while being counted down with the reverse drive of the motors.

The manual switch (12) is operable to drive and control the motors (M1)(M2)(M3), which includes a slide manual switch (12-1), a reclining manual switch (12-2) and a tilt manual switch (12-3), as shown in FIG. 2. As shown in FIG. 1, such manual switch (12) is disposed at the lateral wall of seat cushion (34) of the seat (19). FIG. 2 shows each of the manual switches (12) to be a self-return, seesaw type switch having a neutral "off" contact and two "on" switching contacts, and to be connected with the CPU (18).

The CPU (18) includes a microcomputer (36) which processes input data according to a predetermined program and outputs a proper control signal. This control signal is input into the relay driver (38), which in turn energizes or deenergizes one of motor control relays (RL1 to RL6) to switch over its corresponding one of relay contacts (RL1a to RL6a).

Assuming now that, with the seat (19) being located at a certain position, the slide manual switch (12-1) is operated, then a signal is output therefrom into the CPU(18). The CPU (18) outputs a proper control signal into the relay driver (38) which then sends signal to and energizes one of motor control relays (RL1)(RL2), whereupon the corresponding one of relay contacts (RL1a)(RL2a) is truned on to cause the motor (M1) to drive for moving the seat (19) forwardly and backwardly. In this regard, a normal drive of the motor (M1) causes forward movement of the seat (19), while a reverse drive of motor causes backward movement of seat.

The above actions are done also with regard to the reclining and tilt manual switches (12-2)(12-3). Namely, in brief, operating those switches causes signal transmission among the CPU (18), relay driver (38), and relays (RL3 to RL6, RL3a to RL6a) so as to drive the associated motors (M2)(M3). Thus, the seat back (26) and seat back upper part (26a) are inclined and titled in the fore-and-aft direction relative to the seat cushion for adjustment purpose.

The CPU (18) and relay driver (38) are connected with a power source via a constant power supply source (40), so that the former (18)(38) are energized for their activations by being supplied with a constant voltage from the latter (40).

As shown in FIG. 2, an automatic switch (14) is provided, which comprises a first automatic switch (14-1), a second automatic switch (14-2), and a third automatic switch (14-3). This switch (14) is operable to call predetermined memory positions of the seat (19) which are stored in a preset memory area in the CPU (18). The switch (14) is of a self-return, push type switch and connected with the CPU (18).

With regard to the memory positions, it may be arranged such that three kinds of memory positions can be set and called by the first, second and third automatic switches (14-1)(14-2)(14-3); say, a normal position where an occupant on the seat can take an ordinary seating posture, an enjoy position where he or she can enjoy sight-seeing over the window of automobile, and a relax position where he or she can easily take a rest or nap. It is noted that the position of seat (19), reclining angle of seat back (26) and tilt angle of seat back upper part (26a) are respectively detected from the rotation numbers of the motors (M1)(M2)(M3); namely, an amount of displacement of each of those positions from a set reference value, and then the thus-detected data are stored in memory in the CPU (18).

With such arrangement, operating one of the first, second and third automatic switches (14-1, 14-2, 14-3) calls its associated memory value stored in the CPU (18) to make a comparison beween that memory value and a present value or present counted number detected from the corresponding one of the motors (M1)(M2)(M3). Then, the CPU (18) instructs the relevant motor to drive in a direction to actuate its associated device until the present value meets with the memory value. Therefore, the seat (19) is automatically set in the memory position.

Now, it has been found as a disadvantageous aspect that, since the motor (M1) is controlled its drive by switching operation of the motor control relays (RL1)(RL2), a normal rated voltage is directly or abruptly applied to the motor (M1) every time the motor control relays (RL1)(RL2) are switched over, which inevitably causes an abrupt start or stop of the motor (M1), transmitting a shock or impact to the seat (19) and an occupant thereon. Further, FIG. 1 shows the seat slide device (20) as being slightly inclined, say, at 6 degrees or so relative to the horizontal floor of automobile, which is a known design for preventing a tendency for the occupant to slip forwardly at his or her hip upon the seat (19). For this reason, a greater torque is required in the motor (M1) to cause the seat (19) to climb on the uphill slope of slide device in the forward direction. Thus, the motor torque should be raised for driving the motor (M1) in the normal direction.

With the foregoing factors in view, according to the motor control device (10), the motor torque is lowered properly depending on a load applied to the motor (M1) in each of its normal and reverse drive time, such that the motor starts to work at a lowered speed or reduced to stop with a gradual decrease of speed, within a predetermined short time. For that purpose, the motor torque of the motor (M1 can be changed by means of torque switch element (16).

As shown in FIG. 2, the torque switch element (16) includes a first resistor (R1) and a second resistor (R2) which are connected together in parallel, and a switch relay contact (RL7a) associated with a troque control relay (RL7), with such an arrangement that switching the relay contact (RL7a) brings those tow resistors in an electrical connection with the terminal of the motor (M1) as will be explained later.

The resistors (R1)(R2) may be an ordinary resistor with a low resistance value. The torque control relay (RL7) is connected via the relay driver (38) to the CPU (18). As shown, the relay contact (RL7a) is incorporated in the circuit such as to be switchable over to an "on" contact point or an "off" contact point in order to place the terminals of the resistors (R1)(R2) in a short circuit state or in a normal closed circuit state, respectively, as will be set forth later in more details.

The torque switch element (16) further includes a diode (D1), such that when the resistors (R1)(R2) are brought to an electrical connection with the terminal of motor (M1) in series, the resistance value of those two resistors are varied, depending on a direction of current flow in the motor.

Figure 3:
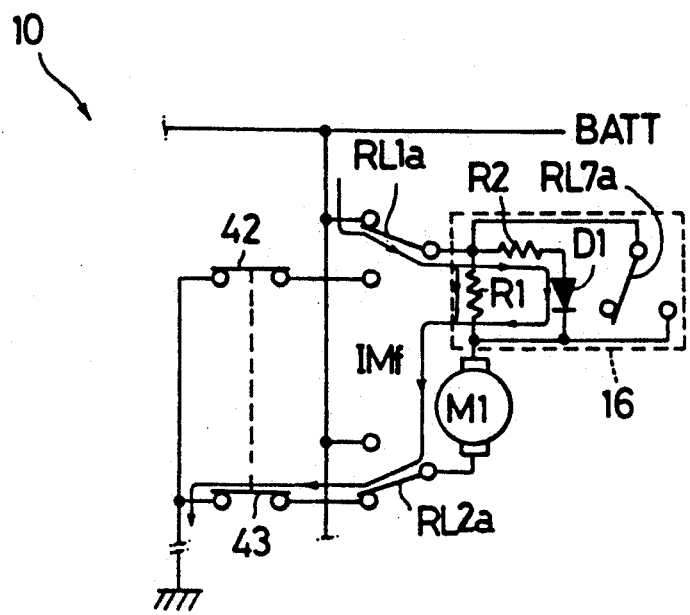
FIG. 3 is a partly broken circuit diagram showing a flow for bringing resistors in electrical connection with the terminal of motor at normal drive.

As shown in FIG. 3, in the case where the motor (M1) starts to drive in the normal direction, with the relay contact (RL1a) being turned to the shown contact point, a motor current (IMf) flows in the diode (D1) in the forward direction, thereby placing the resistors (R1)(R2) in a parallel relation with each other and bringing them in an electrical connection with the terminal of motor (M1). Then, a voltage (VMf) is applied to the motor (M1), whereby the motor (M1) starts to drive in the normal direction under such voltage (VMf). The value of the voltage (VMf) may be obtained from the following formula:

$$VMf \approx VB - \frac{R1 \cdot R2}{R1 + R2} \cdot IMf$$

where VB is a rated voltage (a battery voltage) being applied to the motor (M1) and IMf is a current flowed in the same motor when the seat slide device (20) is actuated thereby to move the seat (19) in the forward direction.

Thus, the motor (M1), at the time of its starting to drive, is limited its speed at a low degree.

In other words, as the parallel circuit state between the resistors (R1)(R2) is being brought to electrical connection with the motor (M1), the battery voltage (VB) is suppressed by the voltage (VMf) applied to the motor, whereupon, under the thus-suppressed motor voltage (VMf), the motor (M1) starts to drive at a low speed in the normal direction.

Figure 4:
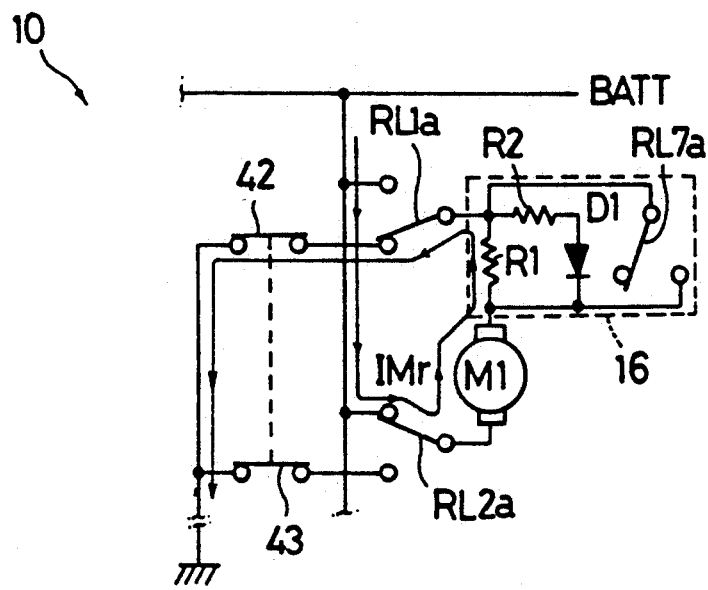
FIG. 4 is a partly broken circuit diagram showing a current flow for bringing the resistors in electrical connection with the terminal of motor at reverse drive.

On the other hand, as shown in FIG. 4, in the case that the relay contacts (RL1a)(RL2a) are switched over to the shown contact points, respectively, for causing a reverse drive of the motor (M1), then the current (IMr) in the motor flows in the direction reversal to that of the diode (D1), and this particular diode (D1) provides a rectification function, so that only the first resistor (R1) is placed in electrical connection with the terminal of motor (M1) in series. Thus, the motor (M1) starts to drive in the reverse direction under a voltage obtained by the following formula:

$$VMr = VB - R1 \cdot IMr$$

In this regard, experiments show that, by setting those two resistors (R1)(R2) at 2 Ω and 0.56 Ω, respectively, (say, as R1=2 Ω, R2=0.56 Ω), the motor (M1) is driven substantially at a same speed in both normal and reverse directions, whereby the seat (19) may be moved generally at the same speed in both forward and backward directions.

According to the present invention, a control is made to determine a certain timing for a period during which the resistors (R1)(R2) are brought to the above-described connection with the motor terminal, depending on whether the motor (M1) is driven in the normal direction or the reverse direction. Namely, the timing of motor torque reduction is controlled. Specifically, referring to FIGS. 5 and 6, when the motor (M1) starts to drive in the normal direction, about 0.2 sec. time period is set for the time when the control relay (RL7) is energized; i.e. the time for bringing the parallel circuit state of resistors (R1)(R2) to electrical connection with the motor terminal, as can be seen from both normal drive time periods (a) in FIG. 5 and (a) in FIG. 6, no matter whether it may be done in the manual control or the automatic control. That is, upon the relevant switch being operated, a time delay of about 0.2 sec. is provided after a drive signal has been emitted by that switch. On the contrary, when the motor (M1) starts to drive in the reverse direction, about 0.5 sec. time period is set for the time when the first resistor (R1) is brought to electrical connection with the motor terminal, as can be seen from both reverse drive time periods (b) in FIG. 5 and (b) in FIG. 6., irrespective of whether it may be done in the manual control or the automatic control.

In the manual control, the slide switch (12-1) is turned on to emit a drive signal and turned off to stop emitting the drive signal. In the automatic control, turning on the automatic switch (16) emits a drive signal, and such drive signal emission is stopped when a present value of the motor (M1) meets with a memory value; namely, when the seat (19) reaches the memory position.

Further, according to the invention, also in the time for stopping the drive of motor (M1), a proper control is made for the time period when the resistors (R1)(R2) is brought to electrical connection with the motor terminal; namely the time for energizing the control relay (RL7). Thus, it is arranged such that a time period for connecting the resistors (R1) (R2) with the terminal of motor (M1) is set differently for stopping the motor in the normal drive and for stopping same in the reverse drive. Specifically stated, as shown, in the manual mode, when the slide switch (12-1) is turned off to stop the normal drive of motor (M1), about 0.4 sec. time period is provided after the stop of relevant drive signal emission from the switch (12-1). Further, in the same manual mode, when turning off that slide switch (12-1) to stop the reverse drive of motor (M1), about 0.7 time period is provided after the stop of relevant drive signal emission from switch. By contrast, in the automatic control mode, the memory position may be called and thus a data for drive amount and drive direction of the motor (M1) is preset, in order to move the seat (19) to the memory position. In this respect, as understandable from FIGS. 3 through 11, it is arranged such that, prior to the seat (19) reaching the memory position, the resistors (R1)(R2) are to be retained in electrical connection with the the terminal of motor (M1) for a certain period of time, to thereby cause the motor to drive at a low speed during such time period, and thereafter, at the memory position, a dynamic braking circuit is formed in the circuit as shown, to stop the motor (M). Thus, when turning off the switch with an intention to stop the normal drive of motor (M1), about 0.4 sec. time period is provided for allowing the motor (1) to decrease its speed until the corresponding drive signal disappears; in other words, the forward movement of the seat (19) shows decrease of speed during about 0.4 sec. before reaching the memory position, and upon the seat (19) reaching the memory position, both terminals of the motor (M1) are placed in short circuit state, thereby creating the dynamic braking effect there, to cease thus-decreased normal drive of motor (M1) at once.

In the same automatic mode, on the other hand, when turning off the switch with an intention to stop the reverse drive of motor (M1), then about 0.7 sec. time period is given for allowing the motor to decrease its speed until the corresponding reverse drive signal disappears. Otherwise stated, the backward movement of the seat (19) shows speed decrease during about 0.7 sec., and thereafter, the same dynamic braking effect as noted above occurs to the motor (M1), thus ceasing thus-decreased reverse drive of motor.

Figure 5:
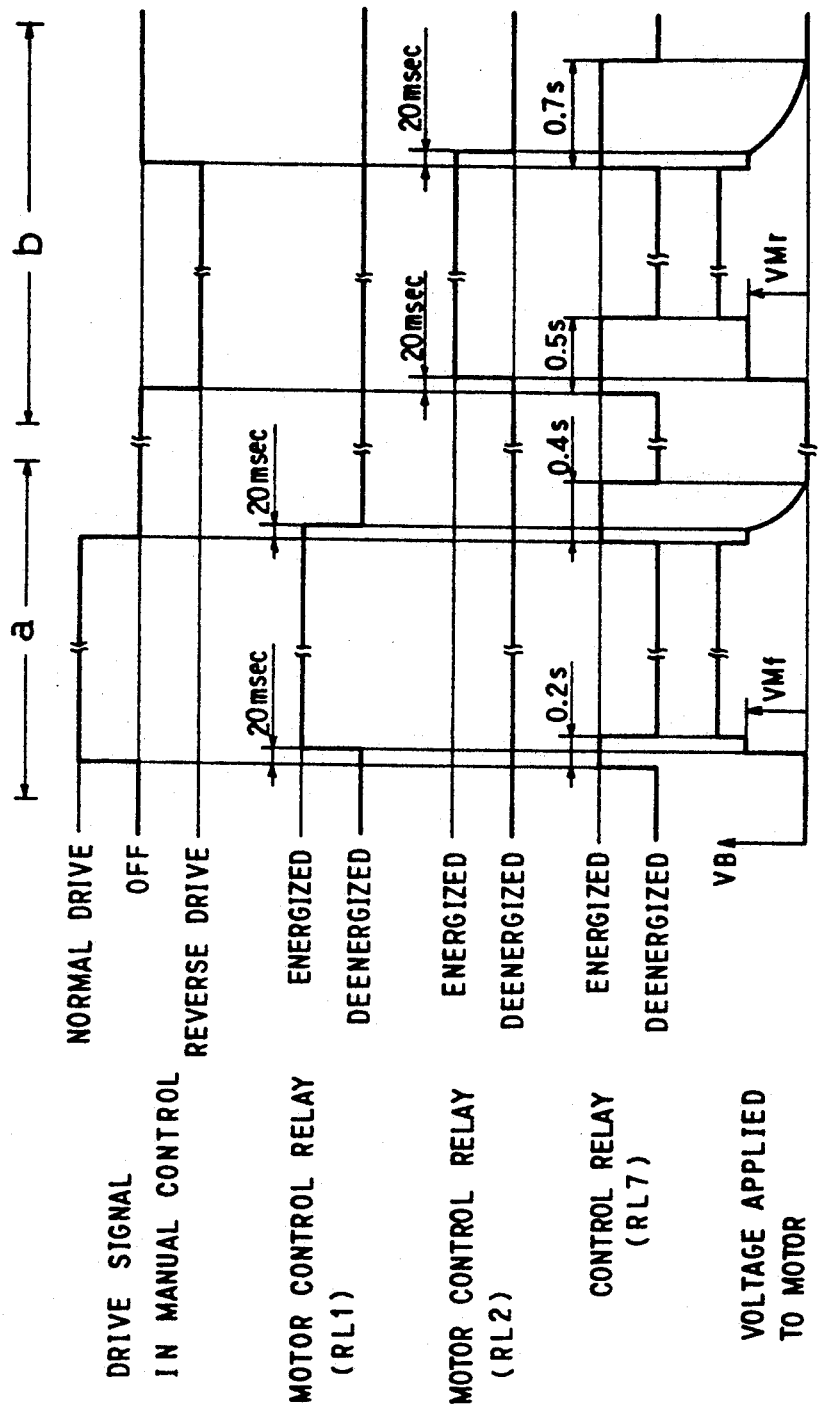
FIG. 5 is a time chart diagram for controlling the motor in a manual control mode.
Figure 6:
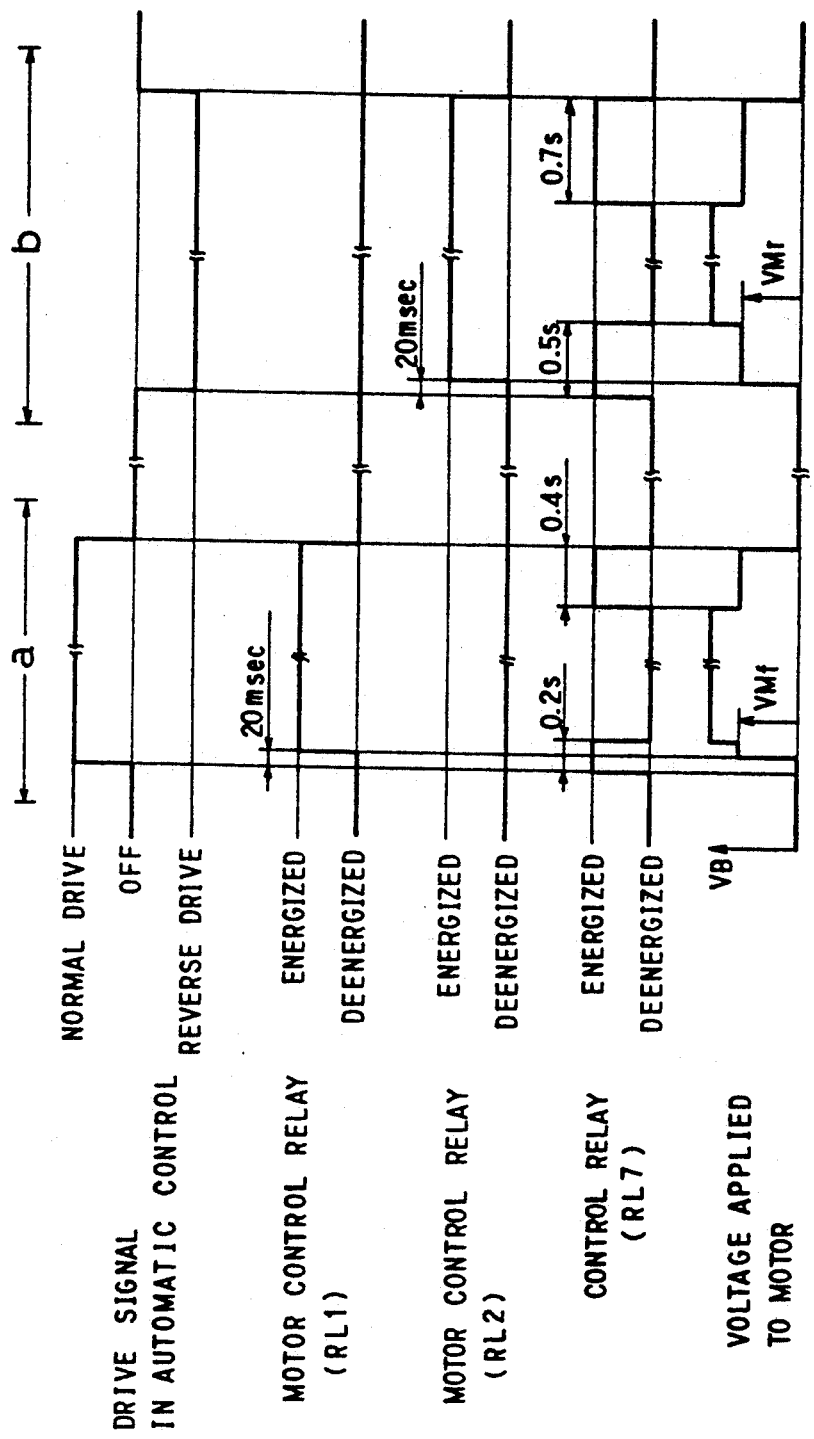
FIG. 6 is a time chart diagram for controlling the motor in an automatic control mode.

As understandable from FIGS. 5 and 6, when turning on the switch to start the normal or reverse drive of motor (M1), about 20 m sec. time lag is given before such start of motor drive, and after lapse of the time lag, one of the motor control relays (RL1)(RL2) is energized to cause the motor (M1) to drive in the normal direction or in the reverse direction.

As shown in FIG. 5, in the manual control, when turning off the switch to stop the motor (M1), the same 20 m sec. time lag is given after the relevant drive signal emission from the switch disappears. Then, after lapse of 20 m sec., the motor control relays (RL1)(RL2) are deenergized to stop the motor (M1). Namely, in the manual control mode, when turning off the switch (12-1), the relevant drive signal emitted therefrom disappears and the motor M1 is lowered its speed during the 20 m sec. time lag, after which, the same dynamic braking effect occurs to the motor (M1), thereby ceasing its drive at once.

Now, referring to FIG. 2, let it be assumed that the manual and automotive switches (12)(14) are turned off, and the motor control relays (RL1 to RL6), as well as the control relay (7) are deenergized, and further that this state is an initial state of the present motor control device (10). A description will be made, under such case, with respect to the manual and automatic modes for controlling the motor (M1) hereinafter.

In the manual control mode, suppose that the slide switch (12-1) is turned off for causing the seat (19) in the forward direction, then, as shown in the range (a) in FIG. 5, a relevant drive signal is emitted from the switch (12-1) and almost at the same time, the control relay (RL7) is energinzed, and after lapse of 20 m sec. time lag from such drive signal emission, the motor control relay (RL1) is energized.

Then, as shown in FIG. 3, the corresponding relay contacts (RL7a)(RL1a) are turned over to their respective shown contact points, thereby releasing the short circuit state between the terminals of resistors (R1)(R2) and bringing those two resistors, which are connected together in parallel, to electrical communication with the terminal of motor (M1). Namely, as indicated at the area (a) in FIG. 5, the voltage is suppressed by the resistors (R1)(R2) and then, thus-lowered voltage (VMf) is applied to the motor (M1), whereupon the normal drive of motor (M1) is decreased under such voltage (VMf).

Figure 7:
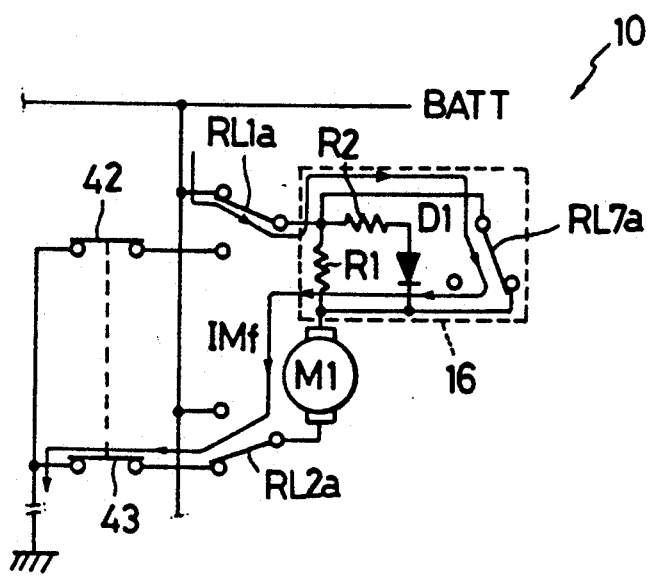
FIG. 7 is a partly broken circuit diagram showing a direct supply of battery voltage to the motor, when the motor is driven in the normal direction.

Thereafter, as can be seen from the area (a) in FIG. 5 and FIG. 7, the preset time of 0.2 sec. is given, and after lapse thereof, the control relay (RL7) is deenergized, which brings its relay contact (RL7a) to contact with the other contact point as in FIG. 7, with the result that a short circuit is formed between the resistors (R1)(R2), allowing direct flow of the current (IMf) into the motor (M1) via the line including the relay contact (RL7a) without flowing through those resistors. Hence, the motor (M1) is driven at an ordinary speed in the normal direction under the battery voltage (VB), causing the seat (19) to move forwardly.

If it is desired at this point to stop the seat (19) at a certain position, the switch (12-1) should be turned off, and then the drive signal emission therefrom is cut off, thus enerziging immediately the control relay (RL7), as shown in the area (a) of FIG. 5, so that the associated relay contact (RL7a) is switched back to the contact as shown in FIG. 3. Then, 20 m sec. time lag is given until the first motor control relay (RL1) is deenergized to turn over its relay contact (RL1a). During only such 20 m sec. time lag, the transistors R1)(R2), which are connected together in parallel, are brought in electrical communication with the terminal of motor (M1) to supply the suppressed voltage (VMf) to the motor (M1): Thus, during 20 m sec. the motor M1 is driven at a lowered speed.

Figure 8:
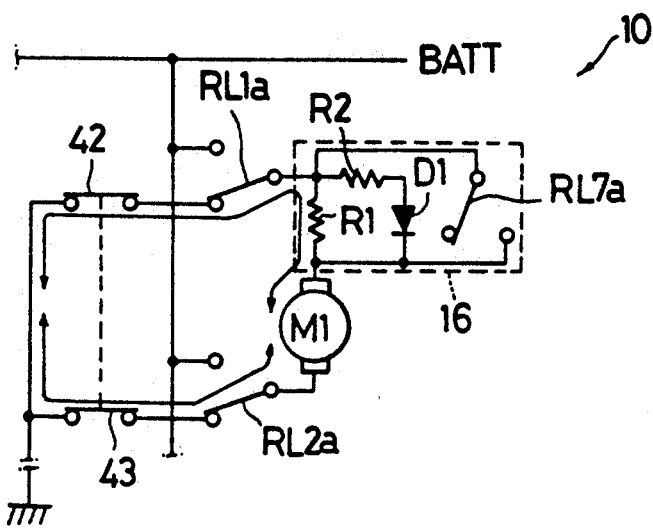
FIG. 8 is a partly broken circuit diagram showing a dynamic braking state where the motor is stopped.

After lapse of such 20 m sec. time, the foregoing first motor control relay (RL1) is deenergized to turn over its relay contact (RL1a) to the contact point as shown in FIG. 8, whereby both terminals of motor (M1) are brought in a short circuit state via those two resistors (R1)(R2), as seen from the FIG. 8. At this moment, a dynamic braking effect occurs to the motor (M1), but the first resistor (R1) serves to lower such dynamic braking effect, whereupon the motor (M1) is further decreased in speed and in addition, during 0.4 sec. after the 20 m sec. time lag, the voltage applied to the motor (M1) is reduced gradually as shown in the area (a) of FIG. 5, which causes a gradual decrease in the drive of motor (M1).

Then, after such 0.4 sec. time, the control relay (RL7) is deenergized to switch back its contact relay (RL7a) to the contact point as shown in FIG. 2, which places the transistors (R1)(R2) in a short circuit state and forms a loop-like short circuit state around the motor (M1) as shown in the FIG. 2, thereby generating a normal dynamic braking to the motor (M1) without the resistor (R1), and leading the thus gradually reduced drive of motor to a complete stop.

Reversely, if the switch (12) is turned on for causing the seat (19) to move backwardly, a relevant drive signal is emitted therefrom and then the control relay (RL7) is energized. Also, after 20 m sec. time lag, the motor control relay (RL2) is energized. Then, as shown in FIG. 4, the relay contacts (RL7a) (RL2a) are switched over to their respective shown contact points, thereby bringing the first resistor (R1) in electrical connection, in series, with the terminal of motor (M1). Thus, at a voltage (VMr) suppressed by that resistor (R1), the reverse drive of motor (M1) is decreased in speed.

Figure 9:
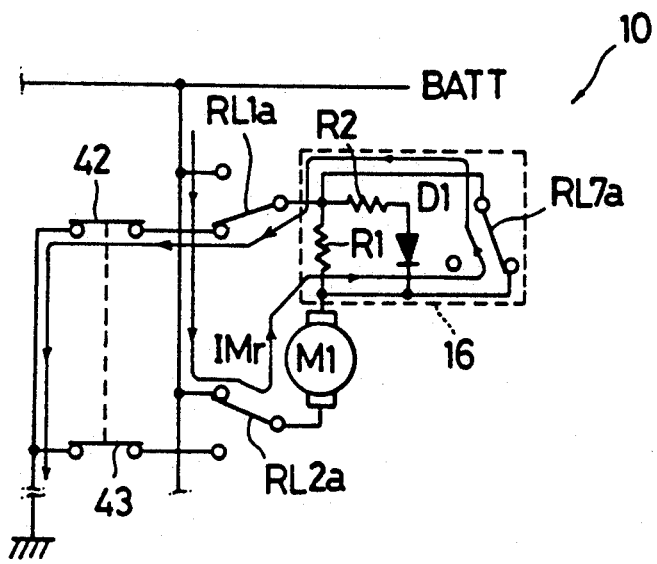
FIG. 9 is a partly broken circuit diagram showing a direct supply of battery voltage to the motor, when the motor is driven in the reverse direction.

After 0.5 sec., as shown in the area (b) of FIG. 5 as well as in FIG. 9, the control relay (RL7) is deenergized to switch over its contact (RL7a) to the contact point as shown in FIG. 9, which places both terminals of resistor (R1) in a short circuit state. The current (IMr) does not pass across the resistor (R1) and flows in the motor (M1) via the relay contact (RL7a), so that an ordinary battery voltage (Vb) is applied directly to the motor (M1) and thus the motor (M1) is driven in the reverse direction at an ordinary speed, to cause forward movement of the seat (19).

If it is desired at this point to stop the seat (19) at a certain position, the switch (12-1) should be turned off, and then the drive signal emission therefrom is cut off, thus enerziging immediately the control relay (RL7), as shown in the area (b) of FIG. 5, so as to switch over the associated relay contact (RL7a) to the contact point as shown in FIG. 4. Then, the 20 m sec. time lag is given until the second motor control relay (RL2) is deenergized to turn over its relay contact (RL2a). During only such 20 m sec. time lag, the first transistor (R1) is brought in electrical communication with the terminal of motor (M1) to supply the suppressed voltage (VMr) to the motor (M1): Thus, during 20 m sec. the motor (M1) is driven at a lowered speed.

After lapse of such 20 m sec. time, the foregoing second motor control relay (RL2) is deenergized to turn over its relay contact (RL2a) to the contact point as shown in FIG. 8, whereby both terminals of motor (M1) are placed in a short circuit state via the first resistor (R1), as seen from the FIG. 8. At this moment, a dynamic braking effect occurs to the motor (M1), but the first resistor (R1) serves to lower such dynamic braking effect, wherein the motor (M1) is further decreased in speed and in addition, during 0.7 sec. after the 20 m sec. time lag, the voltage applied to the motor (M1) is reduced gradually as shown in the area (b) of FIG. 5, which causes a gradual decrease in the drive of motor (M1).

Then, after such 0.7 sec. time, the control relay (RL7) is deenergized to switch back its contact relay (RL7a) to the contact point as shown in FIG. 2, which places the transistors (R1)(R2) in a short circuit state and forms a loop-like short circuit state around the motor (M1) as shown in the FIG. 2, thereby generating a normal dynamic braking to the motor (M1) without the resistor (R1), and leading the thus gradually reduced drive of motor to a complete stop.

In the automatic mode, if one of the automatic switches (16) is selected and operated, the CPU (18) calls a memory value or memory position corresponding to the selected automatic switch and compares such memory value with the present value or present position of the seat (19), to thereby recognize how much and in which direction the motor (M1) should be driven in order to move the seat (19) to the memory position. If a drive signal is generated to cause the motor (M1) to drive in the normal direction, the control relay (RL7) is energized and after lapse of 20 m sec. time lag, the first motor control relay (RL1) is energized, as shown in the area (a) in FIG. 6. Then, similarly to the manual control mode, as shown in FIG. 3, the relay contacts (RL7a)(RL1a) are switched over to their respective shown contact points, thus releasing the short circuit state between the terminals of resistors (R1)(R2) and bringing those two prallel resistors to electrical communication with the terminal of motor (M1). Namely, as shown in the area (a) of FIG. 6, the voltage (VMf) suppressed by the resistors (R1)(R2) is applied to the motor (M1), so that the motor (M1) starts to drive at a low degree in the normal direction.

Then, after lapse of 0.2 sec. time, as shown in the area (a) of FIG. 6, the control relay (RL7) is deenergized to switch over its relay contact (RL7a) to the shown contact point, thus forming a short circuit state between both terminals of resistors (R1)(R2). Thus, as shown in FIG. 7, the current (IMf) flows directly in the motor (M1) via the relay contact (RL7a), so that the battery voltage (VB) is applied to the motor (1), which is in turn driven at an ordinary speed in the normal direction, causing the seat (19) to move forwardly.

Now, at the point before the seat (19) reaches the above-stated memory position; namely as the time is drawing close to the point, 0.4 sec., as seen in the area (a) of FIG. 6, the control relay (RL7) is energized, with the result that the two resistors (R1)(R2), which are connected together in parallal, are brought to electrical communication, in series, with the terminal of motor (M1), likeise as in FIG. 4. Consequently, the battery voltage is suppressed by those two resistors (R1)(R2), and under the thus-lowered voltage, the motor (M1) is driven at a low speed. It is noted here that the time during which the motor (M1) is thus driven at a low speed is computed in the CPU (18) as number of rotation of motor (M1), depending on the speed at which the seat (19) has to move forwardly, and such 0.4 sec. time lag is set by counting a certain value at which the present value of motor (M1) reaches within range of the memory value: That is, 0.4 sec. before the seat (1) reaches the memory position, at which time, the control relay (RL7) is energized.

After lapse of such 0.4 sec. time, when the present value of motor (M1) meets with the memory value, the drive signal emission is ceased, as shown in the area (a) of FIG. 6, and responsive thereto, both motor control relay (RL1) and control relay (RL7) are deenergized, whrereupon a dynamic bracking effect occurs to the motor (M1) and then the decreased drive of motor (M1) is stopped (see FIG. 2).

If one of the autotmatic switch (16) is operated, and the CPU (18) emits a drive signal for causing reverse drive of motor (M1), as shown in the area (b) of FIG. 6, the control relay (RL7) is energized and after 20 m sec. time lag, the second motor control relay (RL2) is energized. Then, as shown in FIG. 4, the relay contact (RL2a)(RL7a) are switched over to their respective shown contact points, thus releasing the short circuit state between both terminals of the first resistor (R1), and then the resistor (R1) is brought to electrical communication, in series, with the terminal of motor (M1), so that under the voltage (vMr), the motor starts to drive a low speed in the reverse direction.

Then, as shown in the area (b) of FIG. 6, after lapse of 0.5 sec., namely, a time between the drive signal emission and commencement of motor drive, the control relay (RL7) is deegergized to switch over its relay contact (RL7a) to the contact point as shown in FIG. 9, thereby forming a short circuit between both terminals of resistor (R1), whereupon the current (IMr) flows directly in the motor (M1) via the relay contact (RL7a), without passing through the resistor (R1), and under the ordinary battery voltage (VB), the motor (M1) is driven at an ordinary speed in the reverse direction, causing the seat (1) backwardly.

As shown in the same area (b) of FIG. 6, when the present value of motor (M1) reaches a certain value; in other words, at the time of 0.7 sec. before the seat (19) reaches the memory position (i.e. the time point set in the time range during which the seat (1) reaches the memory position), then the control relay (RL7) is energized, and the first resistor (R1) is brought in electrical communication, in series, with the terminal of motor (M1) (see FIG. 4). As a result, the battery voltage is suppressed by that resistor (R1), and then, under thus-lowered voltage (vMr), the motor (M1) is driven at a low speed.

After lapse of the 0.7 sec. time lag, when the present value of motor (M1) meets with the memory value, the drive signal emission is ceased as shown in the area (b) of FIG. 6, with the result that both motor control relay (RL2) and control relay (RL7) are deenergized, and due to the dynamic braking effect produced in the circuit, the decreased drive of motor (M1) is stopped at once (see FIG. 2).

From the descriptions above, it is to be appreciated that, at the drive commencement of motor (M1), a predetermined resistor will be brought in electrical communication, in series, with the terminal of motor (M1), at a suitable resistance value, and for a certain period of time, depending upon a degree of load applied to the motor (M1) which varies in the normal drive or reverse drive of the motor. In other words, only within a given time, the voltage is suppressed by the resistors (R1)(R2) and at thus-lowered voltage (i.e VMf), the motor (M1) starts to drive at a low speed in the normal or reverse direction, so that the drive commencement of motor (M1) is done softly. Accordingly, in the present invention, it is possible to avoid any chock or impact at the start of motor to an occupant on the seat, and he or she can comfortably adjust the seat in a desired position.

Further, according to the invenion, as stated above, the resistance value of resistors (R1)(R2) as well as the time during which they are in the electrical communicated with the motor terminal are set properly, depending on the degree of load applied to the motor in each of normal and reverse drive. Thus, even in such type of seat slide device (20) inclined relative to the floor, a suitable soft drive commencement of motor (M1) is attained, not only in causing forward movement of seat (19) but also in causing backward movement of same. The occupant on the seat feels good in adjusting the position of seat (19) in the fore-and-aft direction.

Still further, after lapse of the time effecting such low-speed motor drive commencement, the foregoing communication of the resistors with the motor terminal is released or ceased, thus allowing direct supply of original battery voltage (VB) to the motor (M1), and thus, the motor (M1) is driven at an ordinary speed in the corresponding normal or reverse direction. This insures to continue applying the voltage to the motor (M1) without intermission, and protects the rated characteristics of motor. Accordingly, the seat (19) and other associated movable elements or mechanisms may be moved rapidly at unchangeable high speed and the motor per se can be improved to the high-speed one.

Yet further, according to the invention, only at the start or stop of motor (M1), a current flows in the resistors (R1)(R2), and thus, in any other motor drive time, the current is completely prevented from being flowed in the resistors. This permits use of small, inexpensive resistors, because they are not used for long period of time in the present device (10) and as such any overheat or blown-up problem does not occur in such resistors. In contrast to the prior art, there is no need to use any expensive transistors, and the circuit per se in the present invention is very simplified and economical cost-wise.

Designations (42) and (43) denote limit switches for the motor (M1). Designations (46) and (47) denote limit switches for the motor (M3). The former limit switches (42)(43) are used to detect the movement limit points of the seat (19) and instruct the CPU (18) to block the supply of power to the motor (M1), and likewise, the latter ones (46)(47) are used to detect the reclining limit points of the seat back (26a) and instruct the CPU (18) to block the power supply to the motor (M3).

Incidentally, it is perceived widely that the battery or power source for the motor is easily subject to variation in voltage and as such the rotation speed of motor is also variable, which raises the great likelihood of causing the same shock or impact problem as in the prior art at the start or stop of motor.

Figure 10:
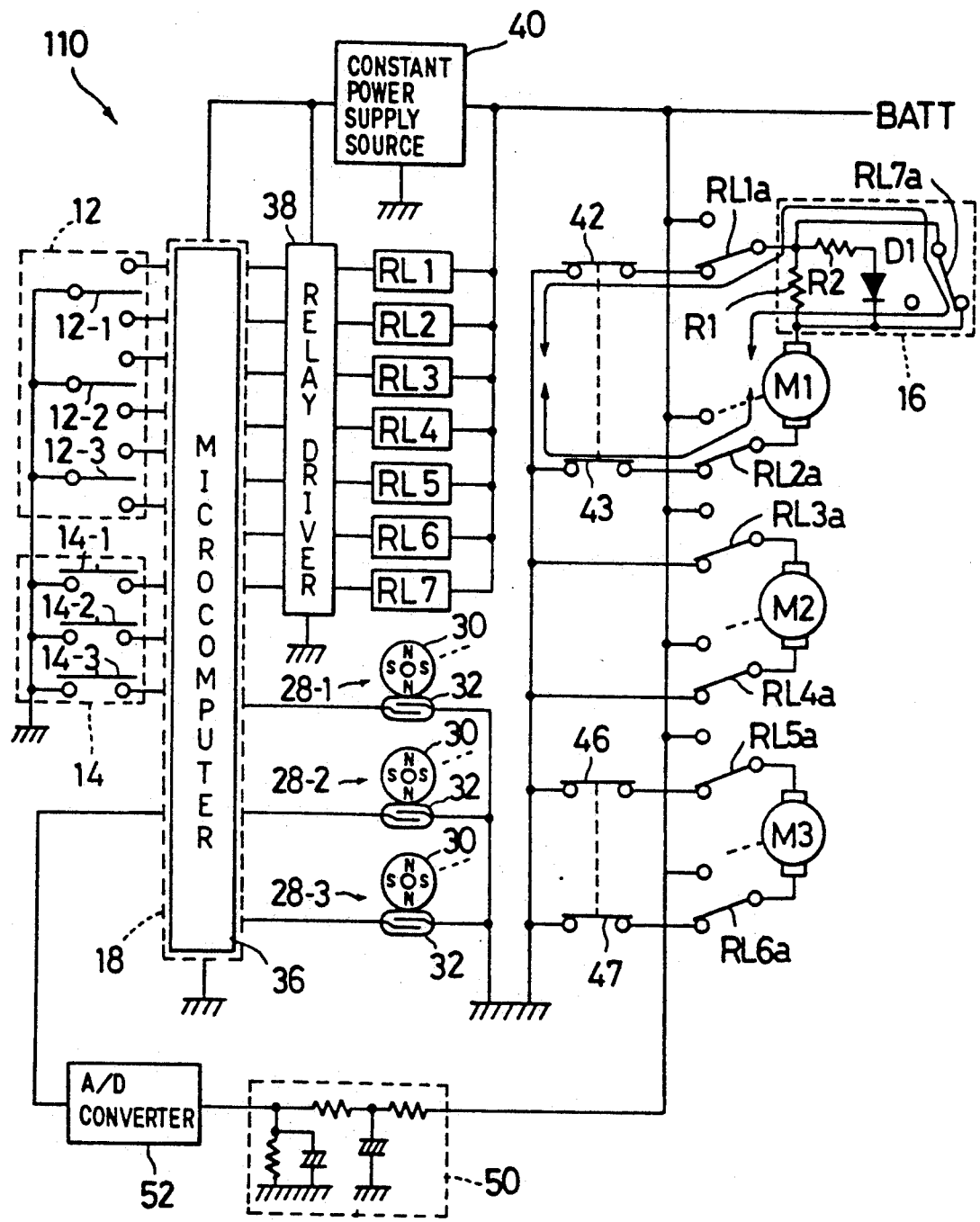
FIG. 10 is a circuit diagram related to another embodiment of the invention.

In order to solve such problem, in accordance with the present invention, there may be incorporated a combination of voltage checking device (50) and A/D converter in the above-described device, as in another embodiment (110) in FIG. 10.

For the voltage checking device (50), a filter circuit as shown may be employed, which allows flow therethrough of only a current having a value lower than a preset reference value. As in FIG. 10, the voltage checking device (50) are connected with the battery while being connected with the CPU (18) via the A/D converter (52).

With this arrangement, if the value of current flowed from the battery is higher than the reference value in the device (50), the current is blocked by the device (50) to emit a small signal, which is then output via the A/D converter (52) into the CPU (18), and thus, the higher voltage state of battery is detected by the CPU (18).

On the other hand, if the current value from the battery is smaller than the reference value in the device (50), then the current is flowed through the device (50) to emit a high signal, which is then ouput via the converter (52) into the CPU (18), and thus, the lower voltage state of batter is detected by the CPU (18).

Figure 11:
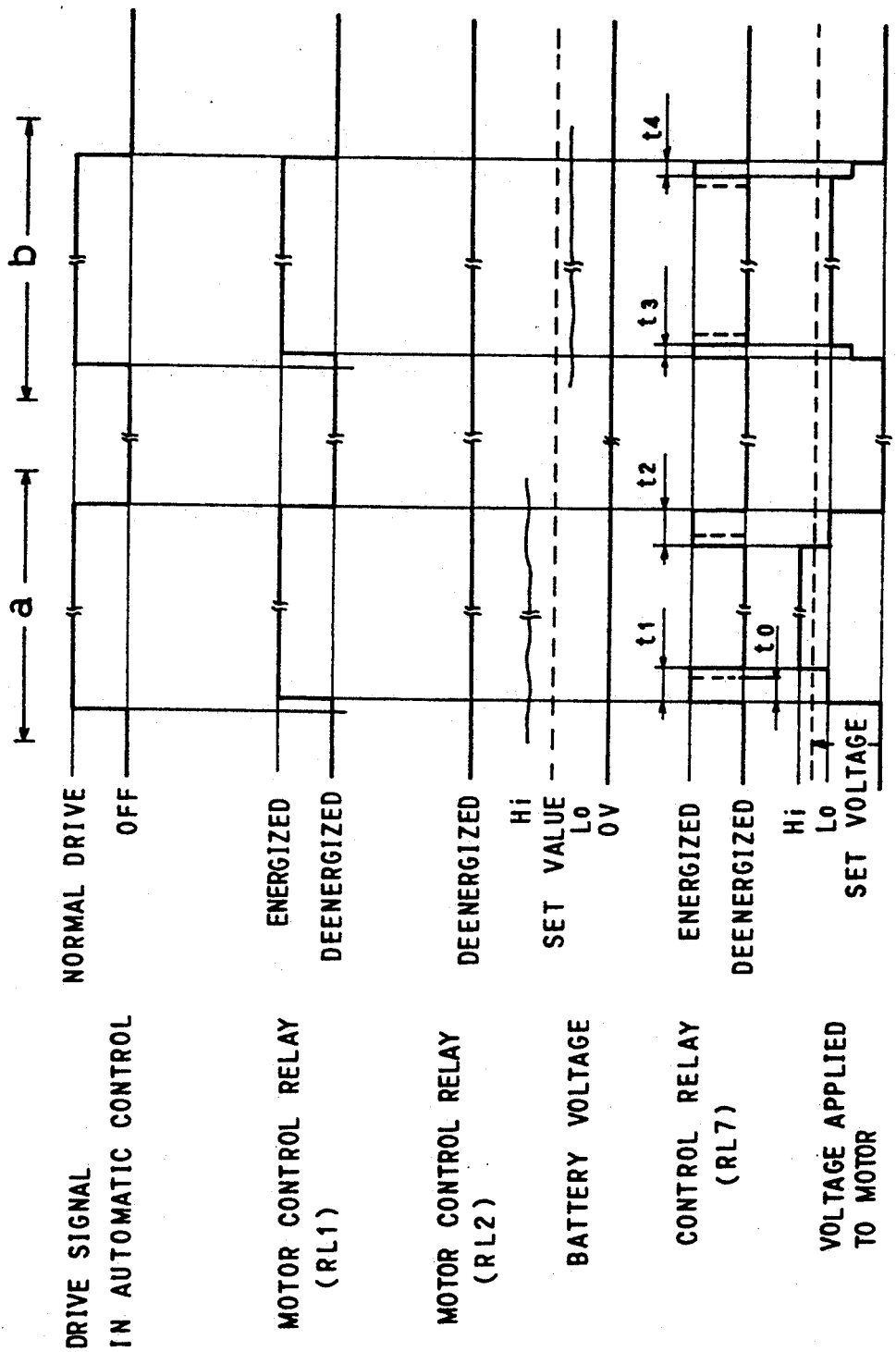
FIG. 11 is a time chart diagram related to such another embodiment for controlling the motor in a manual control mode.

In the automoatic control mode, when the motor (M1) starts to drive in the normal direction, a relevant drive signal is emitted, as shown in the area (a) in FIG. 11, and then after 20 m sec. time lag, both motor control relay (RL1) and control relay (RL7) are energized, with the result that the voltage applied to the motor (M1) is suppressed and, under thus-lowered voltage (VMf), the motor (M1) is driven at a low speed in the normal direction. Under such condition, if a higher voltage state of the battery is detected from a small signal being emitted from the device (50), then a cetain time (t1) is given in this particular normal drive of motor (M1), and only during such time (t1), the control relay (RL7) is energized, thereby causing the motor (M1) to start its normal drive at a low speed. After lapse of such time (t1), the relay (RL7) is deenerziged and therefore, the battery voltage is applied to the motor (M1) for normal drive at an ordinary speed. If the switch is operated to stop the motor (M1), a certain time lag (t2) is given, and only during that time lag, the control relay (RL7) is energized, and therefore, owing to the resistors (R1)(R2), the motor (M1) is decreased in speed and driven at a low speed, and when the seat (19) reaches the memory position, both tow relays (RL1)(RL7) are deenergized, with the result that the motor is stopped under the dynamic braking effect.

Referring particularly to the area (a) in FIG. 11, it is seen that, when the current value is withing the reference value (set value), a corresponding voltage (set voltage) is applied to the motor (M1), thus giving a reference time lag (t0), as indicated by the phantom line. In the present high battery voltage case, the foregoing two time lags (t1) and (t2) is longer than such reference time lag (t0), with a view to suppressing any abruptly increased drive of motor (M1) and any shock or impact problem incidental thereto.

On the other hand, if the low voltage state of the battery is detected by a high signal being emitted from the device (50), and, then, as shown in the area (b) of FIG. 11, a certain time lag (t3) is given, which is set according to the battery voltage level. Only during such time lag (t3), the control relay (RL7) is energized, and thus, the motor (M1) starts to drive at a low speed in the normal direction. Thereafter, if the switch is operated to stop the motor (M1), a certain time lag (t4) is given, and only during taht time lag, the control relay (RL7) is again energized, and therefore, owing to the presence of those resistors (R1)(R2), the motor (M1) is decreased in speed and driven at a low speed. Then, when the seat (19) reaches the memory position, both two relays (RL1)(RL7) are deenergized, with the result that the motor is stopped under the dynamic braking effect.

In the present low battery voltage case, as seen in the area (b) of 11, the foregoing two time lags (t3)(t4) are shorter than the reference time lag (t0). This is because such low battery voltage state does not cause any abruptly increased drive of motor (M1), and the short time lags (t3)(t4) are sufficient, or rather, which is effective in preventing an occupant on the seat from feeling the low-speed movement of the seat (19) by such short time lags.

Likewise, as can be seen from the areas (a) and (b) in FIG. 12, when the motor (M1) is driven in the reverse direction, if the battery voltage is high, then a longer time lag (t5) is given for allowing the motor (M1) to start to drive at a low speed, while another longer time lag (t6) is given for decreasing the drive of motor (M1) until its stop. Also in the same reverse drive case, if the battery voltage is low, then a shorter time lag (t7) is givnen for allowing the motor (M1) to start its drive at a low speed, while another shorter time lag (t8) is given for decreasing the drive of motor (M1) until its stop.

While having described the present invention thus far, it should be understood that the invention is not limited to the illustrated embodiment, but any other modifications, replacements and additions may be made thereto structurally without departing from the spirit and scope of the appended claims. For example, the above-described control of timing may be applied to the manual control mode, and instead of the relays (RL7)(RL7a), another other suitable means may be used for bringing the resistors (R1)(R2) in electrical communication with the motor terminal and releasing such electrical communication. The value of first resistor (R1) may be different from or identical to that of second resistor (R2) in order to attain a different or same motor torque in the normal and reverse drive of motor (M1). Further, the present invention may be applied to the reclining device (22) and seat back bending device (24). Still further, the invention may be applied to other kinds of seats, such the ones for train, airplane, ships and barbers' seat.

What is claimed is:

1. A method for controlling a motor in a powered seat, in which said seat includes a seating posture adjusting device, said method comprising the steps of:
   supplying a first ordinary voltage;
   detecting one of normal and reverse drive signals emitted from its corresponding switch means;
   giving a certain period of time from a time point when said one of normal and reverse drive signals is emitted;
   bringing a resistor means in an electrical connection, in series, with a terminal of said motor, only during said certain period of time;
   suppressing, thereby, said first voltage to supply a second lowered voltage to said motor;
   causing said motor to start driving at a low speed under said second voltage in one of normal and reverse directions;
   after lapse of said certain time period, releasing said electrical connection of said resistor means with said motor terminal;
   then, allowing direct supply of said first ordinary voltage to said motor, without presence of said resistor means; and
   causing said motor to drive at said first ordinary voltage in said one of normal and reverse directions.

2. The method as defined in claim 1, wherein said method includes the steps of:

checking said first voltage;
comparing said first voltage with a given reference value; and
detecting whether said first voltage is lower or higher than said given reference value;
recognizing a result from said detection;
controlling a timing for bringing said resistor means in electrical communication with said motor terminal, depending upon said result.

3. A method for controlling a motor in a powered seat, in which said seat includes a seating posture adjusting device, said method comprising the steps of:
permitting an automatic control of said motor;
detecting, in said automatic control, how much said motor has to be driven, and in which normal or reverse direction said motor has to e driven, in order to move said seating posture adjusting device to a memory position;
storing such data in memory;
supplying a first ordinary voltage to said motor;
detecting one of normal and reverse drive signals emitted from its corresponding switch means;
providing a first period of time defined between one point when emission of said normal drive signal is ceased and another point when the normal drive of said motor is stopped, until said seating posture adjusting device reaches said memory position;
providing a second period of time defined between one point when emission of said reverse drive signal is ceased and another point when the reverse drive of said motor is stopped, until said seating posture adjusting device reaches said memory position;
bringing a resistor means in an electrical connection, in series, with a terminal of said motor, only during one of said first and second periods of time;
suppressing, thereby, said first voltage to supply a second lowered voltage to said motor;
causing said motor to drive at a low speed at said second voltage in one of said normal and reverse directions;
after lapse of said certain time period, releasing said electrical connection of said resistor mans with said motor terminal;
simultaneously forming a short circuit around said motor to generate a dynamic braking effect thereto; and
causing said low-speed driven of said motor to be stopped under said dynamic braking effect.

4. A method for controlling a motor in a powered seat, in which said seat includes a seating posture adjusting device, said method comprising the steps of:
supplying a first ordinary voltage;
detecting one of normal and reverse driven signals emitted from its corresponding switch means;
providing a first certain period of time defined between one point when said motor starts to drive in normal direction and another point when the normal drive of said motor is stopped;
providing a second certain period of time defined between one point when said motor starts to drive in reverse direction and another point when the reverse drive of said motor is stopped;
bringing a resistor means in an electrical connection, in series, with a terminal of said motor,
suppressing, thereby, said first voltage to supply a second lowered voltage to said motor;
causing said motor to start driving at a low speed under said second voltage in one of said normal and reverse directions;
after lapse of said first certain time period, releasing said electrical connection of said resistor means with said motor terminal;
simultaneously forming a short circuit around said motor to generate a dynamic braking effect thereto;
causing said low-speed drive of said motor to be stopped under said dynamic braking effect;
permitting an automatic control of said motor;
detecting, in said automatic control, that said switch means is turned off;
giving a third certain period of time from a time point when said signal emission is ceased;
bringing a resistor means in an electrical connection, in series, with a terminal of said motor, only during said third certain time period;
suppressing, thereby, said first voltage to supply a second lowered voltage to said motor;
causing said motor to start driving at a low speed under said second voltage in one of said normal and reverse directions;
after lapse of said second certain time period, releasing said electrical connection of said resistor means with said motor terminal;
simultaneously forming a short circuit around said motor to generate a dynamic braking effect thereto; and
causing said low-speed drive of said motor to be stopped under said dynamic braking effect.

5. A method for controlling a motor in a powered seat, in which said seat includes a seating posture adjusting device, said method comprising the steps of:
supplying a first ordinary voltage to said motor;
detecting one of normal and reverse drive signals emitted from its corresponding switch means;
providing a first period of time defined between one point when emission of said normal drive signal is ceased and another point when the normal drive of said motor is stopped;
providing a second period of time defined between one point when emission of said reverse drive signal is ceased and another point when the reverse drive of said motor is stopped;
bringing a resistor means in an electrical connection, in series, with a terminal of said motor, only during one of said first and second periods of time;
suppressing, thereby said first voltage to supply a second lowered voltage to said motor;
causing said motor to drive at a low speed at said second voltage in one of said normal and reverse drives;
after lapse of said certain time period, releasing said electrical connection of said resistor means with said motor terminal;
simultaneously forming a short circuit around said motor to generate a dynamic braking effect thereto; and
causing said low-speed drive of said motor to be stopped under said dynamic braking effect.

6. A device for controlling a motor in a powered seat, in which said seat includes a seating posture adjusting device, said device comprising:
a manual switch for causing a manual control of said motor to adjustably actuate said seating posture adjusting device;

an automatic switch for causing an automatic control of said motor to automatically actuate said seating posture adjusting device to a preset seat posture;

a motor torque switch means, by which a predetermined resistor means is selectively brought in electrical connection with a terminal of said motor so as to change a torque of said motor; and a central processing unit which processes an input data according to a predetermined program, so as to control at least a drive of said motor and an actuation of said motor torque switch means;

wherein one of normal and reverse drive signals from said manual and automatic switches is detected by said central processing unit, which in turn provides a first period of time defined between one point when said motor starts to drive in normal direction and another point when the normal drive of said motor is stopped, and a second period of time define din reverse direction and another point when the reverse drive of said motor is stopped, and then, said motor torque switch means brings said resistor means in electrical connection, in series, with said motor terminal, only during at least one of said first and second periods of time.

7. The device as defined in claim 6, wherein there is further provided a means for checking a voltage supplied from a power source to said motor, and wherein said checking means compares said voltage with a given reference value preset therein and detecting whether the voltage is lower or higher than said give reference value, with such an arrangement that said central processing unit recognize a result from said detections of said checking means and controls properly a timing for bringing said electrical connection in series of said resistor means with said motor terminal depending upon said result.

* * * * *